(12) United States Patent
Dutta

(10) Patent No.: US 9,888,280 B2
(45) Date of Patent: Feb. 6, 2018

(54) METHOD AND SYSTEM FOR PROVIDING CONTEXTUAL INFORMATION DURING VIDEO BUFFERING

(75) Inventor: Debajyoti Dutta, Hoogly (IN)

(73) Assignee: EXCALIBUR IP, LLC, New York, NY (US)

( * ) Notice: Subject to any disclaimer, the term of this patent is extended or adjusted under 35 U.S.C. 154(b) by 6 days.

(21) Appl. No.: 13/448,407

(22) Filed: Apr. 17, 2012

(65) Prior Publication Data

US 2013/0276041 A1    Oct. 17, 2013

(51) Int. Cl.
| | |
|---|---|
| *H04N 21/433* | (2011.01) |
| *H04N 21/458* | (2011.01) |
| *H04N 21/462* | (2011.01) |
| *H04N 21/44* | (2011.01) |

(52) U.S. Cl.
CPC ... *H04N 21/4331* (2013.01); *H04N 21/44004* (2013.01); *H04N 21/458* (2013.01); *H04N 21/4622* (2013.01)

(58) Field of Classification Search
CPC .... H04N 21/04; H04N 21/81; H04N 21/4331; H04N 21/4622; H04N 21/458; H04N 21/23406; H04N 21/4325; H04N 21/4333; H04N 21/44004; H04N 21/44008; H04N 21/44016; H04N 21/44209; H04N 21/6125; H04N 21/812; H04N 21/8455; H04N 7/163

USPC ...................... 725/94, 96, 109, 110
See application file for complete search history.

(56) References Cited

U.S. PATENT DOCUMENTS

| | | | |
|---|---|---|---|
| 7,721,306 B2 * | 5/2010 | Watanabe et al. | 725/32 |
| 7,739,596 B2 * | 6/2010 | Clarke-Martin et al. | 715/716 |
| 2008/0109556 A1 * | 5/2008 | Karlberg | 709/231 |
| 2008/0306999 A1 * | 12/2008 | Finger et al. | 707/104.1 |
| 2010/0241962 A1 * | 9/2010 | Peterson | G06F 3/0481 715/720 |
| 2010/0306049 A1 * | 12/2010 | Kakade et al. | 705/14.49 |
| 2013/0054825 A1 * | 2/2013 | Mareachen | H04N 21/4325 709/231 |
| 2013/0174035 A1 * | 7/2013 | Grab | 715/716 |

* cited by examiner

*Primary Examiner* — Benjamin R Bruckart
*Assistant Examiner* — Tien M Nguyen
(74) *Attorney, Agent, or Firm* — James J. DeCarlo; Greenberg Traurig, LLP

(57) ABSTRACT

A computer-implemented method of providing contextual information during video buffering includes playing a video in response to a user input. The video includes metadata and tags. The computer-implemented method also includes extracting contextual information based on the metadata and the tags. Further, the computer-implemented method includes pausing the video for video buffering. Furthermore, the computer-implemented method includes displaying the contextual information during the video buffering. The computer-implemented method includes resuming the playing of the video subsequent to the video buffering.

10 Claims, 3 Drawing Sheets

METHOD AND SYSTEM FOR PROVIDING CONTEXTUAL INFORMATION DURING VIDEO BUFFERING

TECHNICAL FIELD

Embodiments of the disclosure relate generally, to online video advertising and more specifically, to provide contextual information during video buffering.

BACKGROUND

A significant trend in Internet and technology is watching videos. Playing videos to users requires sufficient Internet bandwidth. However, in certain scenarios, the Internet bandwidth is insufficient for videos to completely play. In such cases, video-serving platforms, for example, YouTube performs video buffering.

During the video buffering, the video is paused. Consequently, the user experiences an interruption while watching the video. During the interruption, attention of the user gets diverted to other links and websites. The user can perhaps even forget about the video that was being watched. Further, frequency of the video buffering might increase due to a slow network. The user hence experiences frequent interruptions thereby leaving the user unsatisfied. Further, traffic directed to an associated website is declined.

In light of the foregoing discussion, there is a need for an efficient method and system for providing users with contextual information during video buffering.

SUMMARY

The above-mentioned needs are met by a computer-implemented method, computer program product, and system for providing contextual information during video buffering.

An example of a computer-implemented method of providing contextual information during video buffering includes playing a video in response to a user input. The video includes metadata and tags. The computer-implemented method also includes extracting contextual information based on the metadata and the tags. Further, the computer-implemented method includes pausing the video for video buffering. Furthermore, the computer-implemented method includes displaying the contextual information during the video buffering. Moreover, the computer-implemented method includes resuming the playing of the video subsequent to the video buffering.

An example of a computer program product stored on a non-transitory computer-readable medium that when executed by a processor, performs a method of providing contextual information during video buffering includes playing a video in response to a user input. The video includes metadata and tags. The computer program product also includes extracting contextual information based on the metadata and the tags. Further, the computer program product includes pausing the video for video buffering. Furthermore, the computer program product includes displaying the contextual information during the video buffering. Moreover, the computer program product includes resuming the playing of the video subsequent to the video buffering.

An example of a system of providing contextual information during video buffering includes a web interface. The web interface displays a video in response to a user input. The video includes metadata and tags. The system also includes an extractor module that extracts the contextual information based on the metadata and tags. Further, the system includes a video player that plays the video and the contextual information.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, computer program product, and system for providing contextual information during video buffering are disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
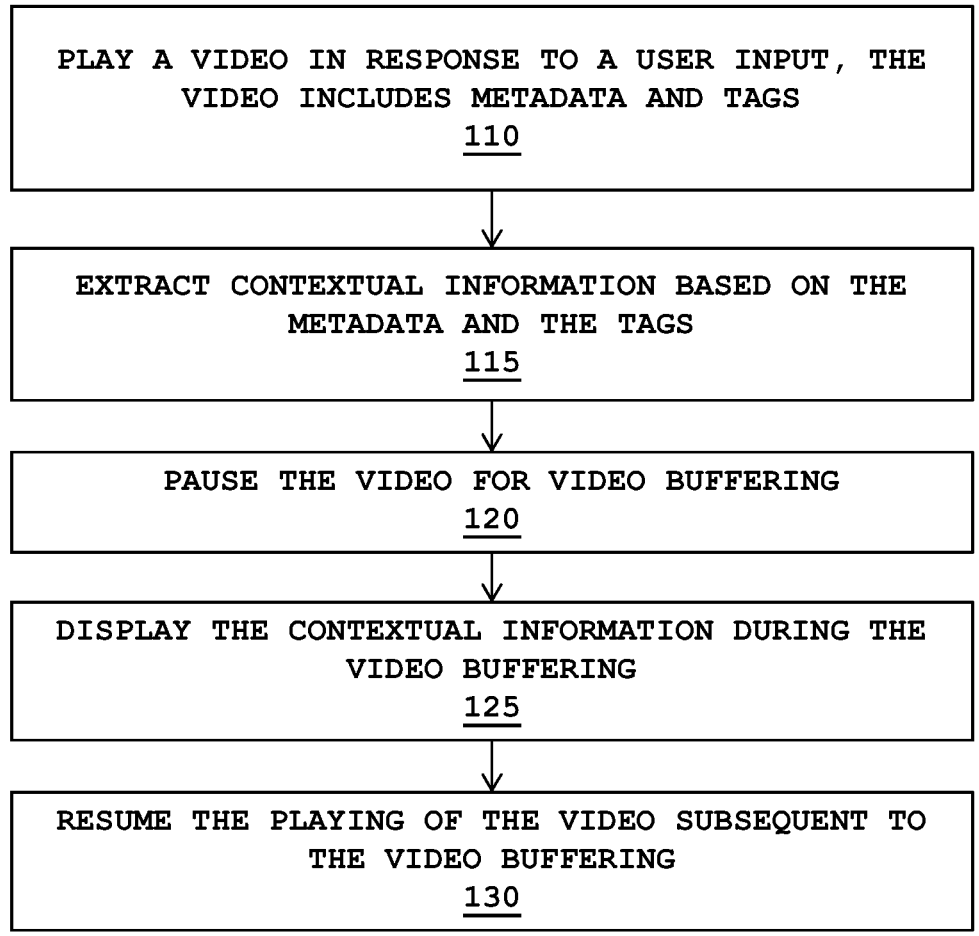
FIG. 1 is a flow diagram illustrating a method of providing contextual information during video buffering, in accordance with one embodiment.

FIG. 1 is a flow diagram illustrating a method of providing contextual information during video buffering, in accordance with one embodiment.

At step 110, a video is played in response to a user input. The video includes metadata and tags.

The user desires to view a specific webpage by entering an appropriate URL (Uniform Resource Locator) in a web browser. The web browser can be a desktop web browser (for example, Internet Explorer, Mozilla, or Chrome), a mobile browser, or a web viewer built into an application program. The webpage can include textual information, digital images, videos, video and static advertisements, and other digital assets. Typically, the videos includes multiple moving pictures and text related to a specific product, for example, cars, electronic gadgets, resorts and so on, that are presented to the user.

Examples of the user input includes, but is not limited to, selecting a video advertisement and entering a specific URL to play a desired video.

The video is attached with the metadata and the tags. The metadata and the tags are description details of the video and are not visible to the user. For example, a video on Britney Spears includes metadata and tags, for example, "American", "entertainer", "Baby One More Time" and "pop music".

At step 115, contextual information is extracted based on the metadata and the tags.

The contextual information can be classified as related or interesting information related to the metadata and the tags of the video. Further, the contextual information is extracted from various web resources. Examples of the contextual information includes, but is not limited to, web based encyclopedia information, breaking news, photos, articles, blogs, real-time feeds from micro-blogging sites and social feeds from social networking sites.

Examples of the web based encyclopedia information include, but are not limited to, Wikipedia information, Britannica, Webopedia, and Encyclopedia.

In one embodiment, the contextual information is extracted before the video is played to the user. In such a scenario, the contextual information is stored along with the video in a database and is periodically updated.

At step 120, video buffering is performed.

Videos require sufficient Internet bandwidth for the user to view. However, at times the required Internet bandwidth is inadequate and the network is not fast enough to keep up with playback. In such cases, a video-serving platform, for example, YouTube, performs video buffering, where a certain amount of data is downloaded into a reserved area of memory (buffer) prior to playing the video. During the video buffering, the video is paused until the video buffering is complete.

At step 125, the contextual information is displayed during the video buffering.

As the video is paused during the video buffering, the contextual information is displayed to the user. In some embodiments, the contextual information is displayed in form of a slide show on top of the video, followed by corresponding links to the source of the contextual information. For example, the contextual information can include a headline on "Global Warming could make us shorter" along with a link. As the user clicks on the link, various articles related to the headline could be displayed on top of the video that the user was viewing.

At step 130, playing of the video is resumed subsequent to the video buffering.

As a result, the user is engaged and entertained with related additional information during the video buffering.

As the video resumes playing, further contextual information is extracted. The contextual information is continually being extracted and stored in the database. Subsequently, when the video buffering occurs, the contextual information is displayed to the user without any interruption.

Figure 2:
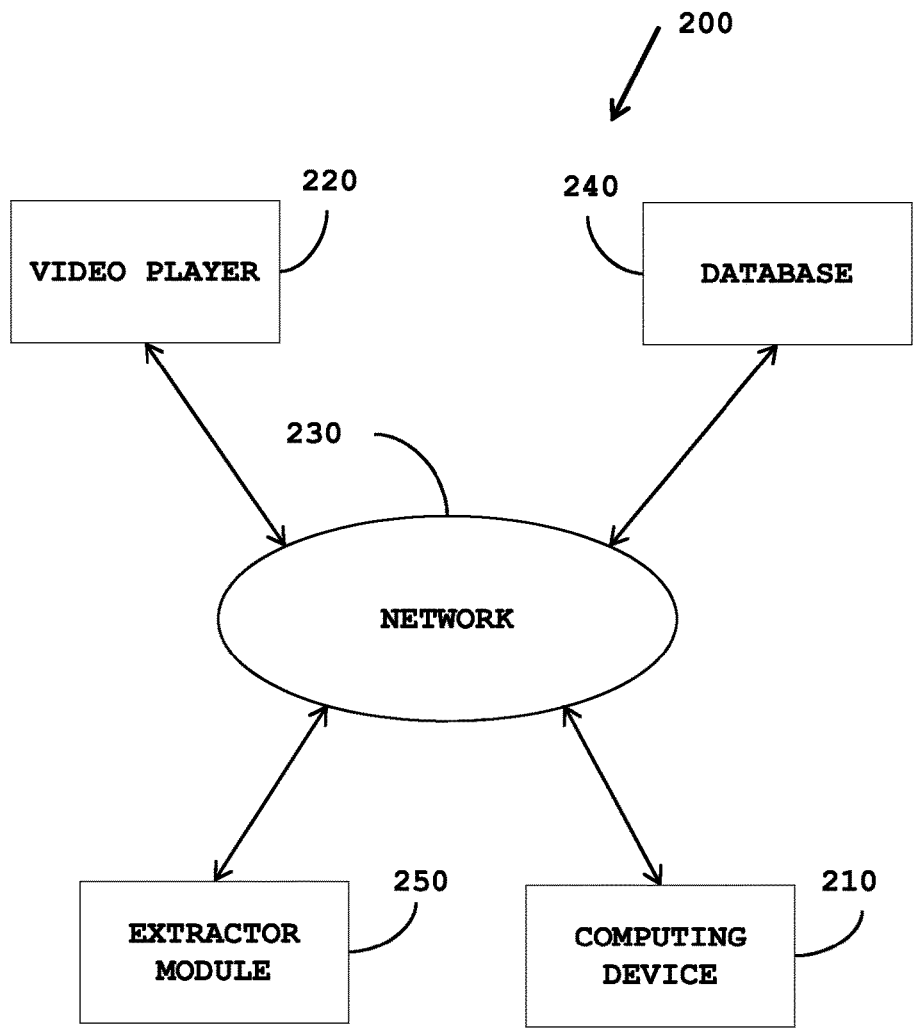
FIG. 2 is a block diagram illustrating a system of providing contextual information during video buffering, in accordance with one embodiment.

FIG. 2 is a block diagram illustrating a system of providing contextual information during video buffering, in accordance with one embodiment.

The system 200 can implement the method described above. The system 200 includes a computing device 210, a video player 220, a database 240, and an extractor module 250 in communication with a network 230 (for example, the Internet or a cellular network).

Examples of the computing device 210 include, but are not limited to, a Personal Computer (PC), a stationary computing device, a laptop or notebook computer, a tablet computer, a smart phone or a Personal Digital Assistant (PDA), a smart appliance, a video gaming console, an Internet television, a set-top box, or other suitable processor-based devices. In one embodiment, the computing device 210 displays a video to a user accessing a webpage. Consequently, the video buffering commences and the video is paused. At this point, contextual information related to the video is displayed to the user. As a result, the user is entertained during the video buffering. Further, the video resumes playing once the buffering is complete. Additional embodiments of the computing device 210 are described in detail in conjunction with FIG. 3.

The database 240 stores the videos along with the metadata and the tags. Further, the contextual information related to the videos is also stored in the database.

In one embodiment, the user of the computing device 210 desires to view a video by accessing a webpage. The computing device 210 initiates communication with the video player 220 through the network 230. The video player 220 plays a video to the user. For a while, the video buffering occurs and the video is paused. At this point, the extractor module 250 extracts the contextual information from the web. The contextual information is based on metadata and tags associated with the video. The extractor module 250 sends the contextual information to the video player 220. In some embodiments, the contextual information is sent to the computing device 210. Further, the video player 220 displays the contextual information to the user. As a result, the user is entertained during the time of video buffering. Once the buffering is complete, the video player 220 resumes playing the video.

Figure 3:
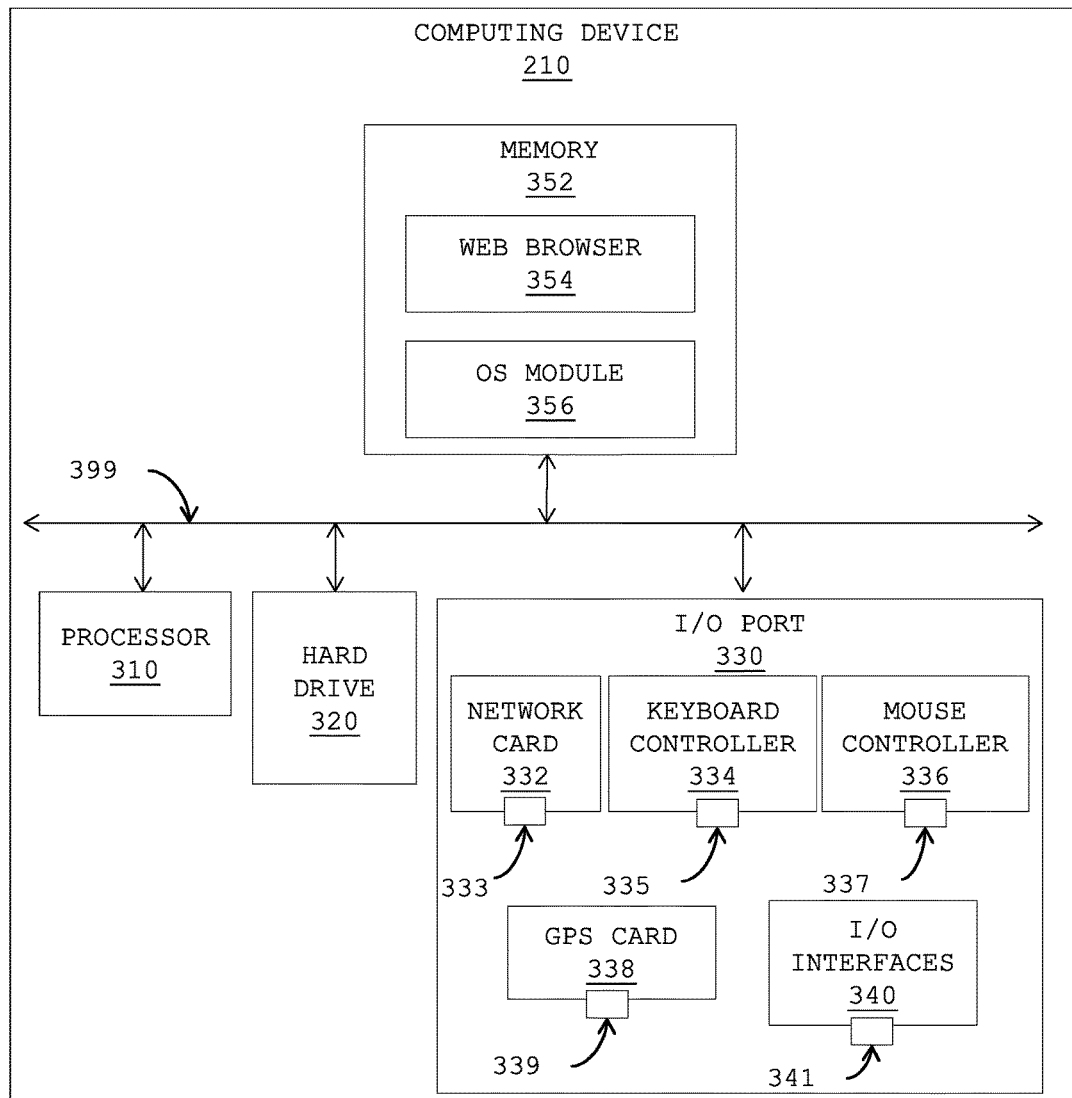
FIG. 3 is a block diagram illustrating an exemplary computing device, in accordance with one embodiment.

FIG. 3 is a block diagram illustrating an exemplary computing device, for example the computing device 210, in accordance with one embodiment. The computing device 210 includes a processor 310, a hard drive 320, an I/O port 330, and a memory 352, coupled by a bus 399.

The bus 399 can be soldered to one or more motherboards. Examples of the processor 310 includes, but is not limited to, a general purpose processor, an application-specific integrated circuit (ASIC), an FPGA (Field Programmable Gate Array), a RISC (Reduced Instruction Set Controller) processor, or an integrated circuit. The processor 310 can be a single core or a multiple core processor. In one embodiment, the processor 310 is specially suited for processing demands of location-aware reminders (for example, custom micro-code, and instruction fetching, pipelining or cache sizes). The processor 310 can be disposed on silicon or any other suitable material. In operation, the processor 310 can receive and execute instructions and data stored in the memory 352 or the hard drive 320. The hard drive 320 can be a platter-based storage device, a flash drive, an external drive, a persistent memory device, or other types of memory.

The hard drive 320 provides persistent (long term) storage for instructions and data. The I/O port 330 is an input/output panel including a network card 332 with an interface 333 along with a keyboard controller 334, a mouse controller 336, a GPS card 338 and I/O interfaces 340. The network card 332 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 333 is configured according to networking compatibility. For example, a wired networking card includes a physical port to plug in a cord, and a wireless networking card includes an antennae. The network card 332 provides access to a communication channel on a network. The keyboard controller 334 can be coupled to a physical port 335 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 336 can also be coupled to a physical port 337 (for example, mouse or USB port). The GPS card 338 provides communication to GPS satellites operating in space to receive location data. An antenna 339 provides radio communications (or alternatively, a data port can receive location information from a peripheral device). The I/O interfaces 340 are web interfaces and are coupled to a physical port 341.

The memory 352 can be a RAM (Random Access Memory), a flash memory, a non-persistent memory device, or other devices capable of storing program instructions being executed. The memory 352 comprises an Operating System (OS) module 356 along with a web browser 354. In other embodiments, the memory 352 comprises a calendar application that manages a plurality of appointments. The OS module 356 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 354 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 354 is used to download the web pages or other content in various formats including HTML, XML, text, PDF, and postscript, and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, Internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

Advantageously, additional information related to the video is delivered to the user. Consequently, user engagement enhances. Further, as the additional information is delivered during video buffering, the video buffering time appears to be less interrupting to the user. Furthermore, advertisement view per click increases.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:
1. A method comprising:
playing, by a processor associated with a computing device, an Internet video in response to a user input, the video comprising metadata and tags that provide descriptive details of the video;
extracting, by the processor over a network, contextual information from one or more web sites, said extraction comprising identifying, over the network, said contextual information from one or more web sites based on the metadata and the tags, and extracting, based on said identification over the network, said contextual information;
pausing, by the processor, the video for video buffering, said video buffering comprising downloading at least a portion of said video into memory of the computing device;

displaying, by the processor during said video buffering, the contextual information, said display of the contextual information during said video buffering comprising displaying said contextual information as a slide show followed by a link to the one or more websites from which the contextual information was extracted;

receiving, by the processor, selection of the displayed link;

displaying, by the processor during said video buffering, in response to receiving said selection, additional contextual information associated with the one or more web sites; and resuming, by the processor, the playing of the video upon the completion of the video buffering, said resuming comprising detecting completion of the video buffering, stopping rendering of the contextual information and additional contextual information, and playing the video from a position where said pausing occurred.

2. The computer-implemented method of claim 1, wherein buffering the video comprises:

pausing the video at the point of video buffering.

3. The computer-implemented method of claim 1 and further comprising storing the contextual information in a database.

4. The computer-implemented method of claim 3 and further comprising periodically updating the contextual information in the database.

5. A non-transitory computer-readable storage medium comprising computer instructions that, when executed by a processor of a computing device, performs a method comprising:

playing, by the processor, an Internet video in response to a user input, the video comprising metadata and tags that provide descriptive details of the video;

extracting, by the processor over a network, contextual information from one or more web sites, said extraction comprising identifying, over the network, said contextual information from one or more web sites based on the metadata and the tags, and extracting, based on said identification over the network, said contextual information;

pausing, by the processor, the video for video buffering, said video buffering comprising downloading at least a portion of said video into memory of the computing device;

displaying, by the processor during said video buffering, the contextual information, said display of the contextual information during said video buffering comprising displaying said contextual information as a slide show followed by a link to the one or more websites from which the contextual information was extracted;

receiving, by the processor, selection of the displayed link;

displaying, by the processor during said video buffering, in response to receiving said selection, additional contextual information associated with the one or more web sites; and resuming, by the processor, the playing of the video upon the completion of the video buffering, said resuming comprising detecting completion of the video buffering, stopping rendering of the contextual information and additional contextual information, and playing the video from a position where said pausing occurred.

6. The non-transitory computer readable storage medium of claim 5, wherein buffering the video comprises:

pausing the video at the point of video buffering.

7. The non-transitory computer readable storage medium of claim 5, further comprising storing the contextual information in a database.

8. The non-transitory computer readable storage medium of claim 7, further comprising periodically updating the contextual information in the database.

9. A computing device comprising:

a processor;

a non-transitory computer-readable storage medium for tangibly storing thereon program logic for execution by the processor, the program logic comprising:

logic executed by the processor for playing an Internet video in response to a user input, the video comprising metadata and tags that provide descriptive details of the video;

logic executed by the processor for extracting, over a network, contextual information from one or more web sites, said extraction comprising identifying, over the network, said contextual information from one or more web sites based on the metadata and the tags, and extracting, based on said identification over the network, said contextual information;

logic executed by the processor for pausing the video for video buffering, said video buffering comprising downloading at least a portion of said video into memory of the computing device;

logic executed by the processor for displaying, during said video buffering, the contextual information, said display of the contextual information during said video buffering comprising displaying said contextual information as a slide show followed by a link to the one or more websites from which the contextual information was extracted;

logic executed by the processor for receiving selection of the displayed link;

logic executed by the processor for displaying, during said video buffering, in response to receiving said selection, additional contextual information associated with the one or more web sites; and logic executed by the processor for resuming the playing of the video upon the completion of the video buffering, said resuming comprising detecting completion of the video buffering, stopping rendering of the contextual information and additional contextual information, and playing the video from a position where said pausing occurred.

10. The computing device of claim 9 and further comprising a database that stores the contextual information corresponding to the video.

* * * * *